(12) United States Patent
Du et al.

(10) Patent No.: US 7,801,138 B2
(45) Date of Patent: Sep. 21, 2010

(54) PSEUDO WIRE LABEL REFLECTOR, AN EDGE EQUIPMENT, A TWO-LAYER VIRTUAL NETWORK AND A METHOD OF PROVIDING PSEUDO WIRE SERVICE

(75) Inventors: Ke Du, Guangdong (CN); Mingyi Wang, Guangdong (CN); Chunhong Huang, Guangdong (CN); Jun Feng, Guangdong (CN); Weidong Zhong, Guangdong (CN)

(73) Assignee: ZTE Corporation, Guangdong (CN)

( * ) Notice: Subject to any disclaimer, the term of this patent is extended or adjusted under 35 U.S.C. 154(b) by 489 days.

(21) Appl. No.: 11/632,445

(22) PCT Filed: Jan. 4, 2005

(86) PCT No.: PCT/CN2005/000001

§ 371 (c)(1),
(2), (4) Date: Dec. 21, 2007

(87) PCT Pub. No.: WO2006/007769

PCT Pub. Date: Jan. 26, 2006

(65) Prior Publication Data

US 2008/0291921 A1    Nov. 27, 2008

(30) Foreign Application Priority Data

Jul. 12, 2004   (CN) ..................... 2004 1 0062494

(51) Int. Cl.
*H04L 12/56* (2006.01)
(52) U.S. Cl. ........................ 370/392; 370/401
(58) Field of Classification Search ............... 370/351, 370/392, 401; 709/227, 238
See application file for complete search history.

(56) References Cited

U.S. PATENT DOCUMENTS

| 7,532,630 | B2 * | 5/2009 | Ould-Brahim | 370/401 |
|---|---|---|---|---|
| 2004/0156313 | A1 * | 8/2004 | Hofmeister et al. | 370/229 |
| 2005/0262264 | A1 * | 11/2005 | Ando et al. | 709/233 |
| 2006/0062218 | A1 * | 3/2006 | Sasagawa | 370/389 |
| 2007/0280267 | A1 * | 12/2007 | Ould-Brahim | 370/395.53 |
| 2008/0310442 | A1 * | 12/2008 | Li | 370/419 |

FOREIGN PATENT DOCUMENTS

WO    WO 2004/025904    3/2004

OTHER PUBLICATIONS

Kang et al, Link Aggregation Member Interface Status Signal, Oct. 17, 2005, Huwei technologies Co., Ltd, 8 pages.*
Ould-Brahim et al, BGP/GMPLS Optical VPNs, Jul. 2001, Internet draft, 14 pages.*
Ould-Brahim et al, BGP/GMPLS Optical/TDM VPNs, Nov. 2001, internet draft.*

* cited by examiner

*Primary Examiner*—Ayaz R Sheikh
*Assistant Examiner*—Mounir Moutaouakil (57) ABSTRACT

A pseudo wire label reflector, based on a existing label distribution router, further includes: a mode management unit, for determining the mode for switching and transferring a pseudo wire label message; a first session management unit, for saving the support information that LDP signaling session connection supports the pseudo wire label reflecting capacity; a first pseudo wire label receiving unit, for receiving a pseudo wire label message; a first pseudo wire management unit, for saving the switched pseudo wire state and deciding whether to modify the pseudo wire label message according to the switch and transfer mode determined by the mode management unit; a first pseudo wire label sending unit, for sending the pseudo wire label message. The invention also provides an edge apparatus, a L2 VPN and a method for providing pseudo wire service in PSN. The present invention makes PE equipments participating pseudo wire service to set up PSN tunnel and LDP signaling session connection with the pseudo wire label reflector by introducing the pseudo wire label reflector and extending the capacity that the current edge apparatus supports the pseudo wire label reflector.

8 Claims, 5 Drawing Sheets

PSEUDO WIRE LABEL REFLECTOR, AN EDGE EQUIPMENT, A TWO-LAYER VIRTUAL NETWORK AND A METHOD OF PROVIDING PSEUDO WIRE SERVICE

CROSS REFERENCE TO RELATED APPLICATIONS

This application claims the priority of PCT Application No. PCT/CN2005/000001, filed Jan. 4, 2005, and Chinese Patent Application No. 200410062494.2, filed Jul. 12, 2004.

BACKGROUND OF THE INVENTION

1. Field of the Invention

The invention relates to the technique of virtual private network, especially to the technique of L2 virtual private network (L2 VPN).

2. Background of the Invention

In the data communication network, packing and transporting L2 protocol data units (L2 PDU) by pseudo wire (PW) could provide emulation L2 service through IP/MPLS (Multiprotocol Label Switching) backbone network. The network adopting this technology can be referred to as a L2 virtual private network (L2 VPN). At present, there are two types of the L2 VPN based on providers:

One is the network providing virtual private wire service (VPWS). In the VPWS frame protocol (as further described in, *PWE3 Architecture*, draft-ieff-pwe3-arch-04.txt), the network model providing pseudo wire emulation edge-to-edge (PWE3) service is given. In the VPWS signaling protocol (as set forth in, *Pseudo Wire Setup and Maintenance using LDP*, draft-ieff-pwe3-control-protocol-06.txt), a label distribution protocol (LDP) signaling mechanism establishing and maintaining pseudo wires between the edge equipments of the backbone network (commonly referred to as provider edge, PE) is given.

The other is the network providing virtual private LAN service (VPLS), which raises a L2 address-based switching function on the basis of establishing pseudo wire between PE equipments. In the network, the establishment and maintenance of the pseudo wire could adopt two types of signaling mechanisms which are LDP and multiprotocol-extension border gateway protocol (MP-BGP), but the LDP signaling mechanism is commonly adopted, as can refer to Virtual Private LAN Services over MPLS, draft-ieff-l2vpn-vpls-ldp-03.txt.

In above-described two types of L2 VPN, the network model which establishes and maintains the pseudo wire by utilizing LDP is flat. It is necessary to establish an edge-to-edge backbone network tunnel (also referred to as packet switching network tunnel or PSN tunnel) and a direct LDP signaling session connection between PE equipments providing pseudo wires. When the network becomes very big and the pseudo wire service on the backbone network increases explosively, this full mesh tunnel and signaling connection will lead to the problem in network scalability. Additionally, when need to provide cross-domain pseudo wire service, it will be even the problem to be solved how to establish lots of cross-domain PSN tunnels and LDP session connections.

BRIEF SUMMARY OF THE INVENTION

The invention is provided in view of the above problems in the prior art. The object of the invention is to provide a pseudo wire label reflector which can support pseudo wire label reflection.

Another object of the invention is to provide an edge equipment which can support the label distribution reflector.

Another object of the invention is to provide a L2 virtual private network which can solve problems in scalability of a L2 VPN in the prior art.

Another object of the invention is to provide a method for providing pseudo wire service which can provide edge-to-edge pseudo wire service in the L2 virtual private network.

According to the first aspect of the invention, a pseudo wire label reflector is provided, comprising: a signaling receiving/sending unit for receiving and sending a label distribution protocol (LDP) signaling message; a pseudo wire label list for saving a pseudo wire label and the related information; a packing/unpacking unit for packing a L2 data package into a multiprotocol label switching data package and unpacking a multiprotocol label switching data package into a L2 data package; a multiprotocol label switching and forwarding unit for receiving and sending a multiprotocol label switching data package; a mode management unit for determining the mode of switching and forwarding a pseudo wire label message; a first session management unit for storing the support information that the label distribution protocol signaling session connection supports pseudo wire label reflecting capacity; a first pseudo wire label receiving unit for receiving a pseudo wire label message; a first pseudo wire management unit for storing the switched pseudo wire state, and determining whether to modify the pseudo wire label message according to the switch and transfer mode determined by the mode management unit; and a first pseudo wire label sending unit for sending a pseudo wire label message.

Preferably, the pseudo wire label reflector further comprises: a first capacity negotiation unit for exchanging the information supporting the pseudo wire label reflect capacity with neighbors.

Preferably, the pseudo wire label reflector further comprises: a second pseudo wire management unit for storing the pseudo wire state when the pseudo wire label reflector is used as an edge equipment.

Preferably, the first and second pseudo wire management unit further comprise: a device for comparing the priorities of the pseudo wire label messages, a device for choosing the pseudo wire label, and a device for writing the pseudo wire labels into the pseudo wire label list.

Preferably, the device for choosing the pseudo wire label chooses the pseudo wire label whose priority is the highest as the pseudo wire label.

Preferably, the device for choosing a pseudo wire label adopts a load balance strategy to choose the pseudo wire label.

Preferably, the pseudo wire label reflector further comprises: a neighbor capacity configuration unit for designating that the neighbors have the capacity negotiation function.

According to the second aspect of the invention, an edge equipment is provided, comprising: a signaling receiving/sending unit for receiving and sending a label distribution protocol signaling message; a pseudo wire label list for depositing pseudo wire labels and the related information; a packing/unpacking unit for packing a L2 data package into a multiprotocol label switching data package and unpacking a multiprotocol label switching data package into a L2 data package; a multiprotocol label switching and transferring unit for receiving and sending the multiprotocol label switching data package; a second session management unit for storing the information about the neighbors who are pseudo wire label reflectors; a second pseudo wire label receiving unit for receiving a pseudo wire label message; a third pseudo wire management unit for storing the pseudo wire state; and a second pseudo wire label sending unit for sending the pseudo wire label message.

Preferably, the edge equipment further comprises: a second capacity negotiation unit for switching the information supporting the pseudo wire label reflect capacity with neighbors.

Preferably, the third pseudo wire management unit further comprises: a device for comparing the priorities of the pseudo wire label messages, a device for choosing the pseudo wire label, and a device for writing the pseudo wire label into the pseudo wire label list.

Preferably, the device for choosing the pseudo wire label chooses the pseudo wire label whose priority is the highest as the pseudo wire label.

Preferably, the device for choosing the pseudo wire label adopts a load balance strategy to choose the pseudo wire label.

According to the third aspect of the invention, a L2 virtual private network is provided, comprising: at least one above-described pseudo wire label reflectors and at least two above-described edge equipments, wherein at least two of the at least two edge equipments adopt a label distribution protocol to establish signaling session connection by the at least one pseudo wire label reflector.

According to the fourth aspect of the invention, a method for providing pseudo wire service in the above-described L2 virtual private network is provided, comprising: a pseudo wire label reflector and an edge equipment determining whether neighbors support pseudo wire label reflection and whether they are the neighbors who are the pseudo wire label reflectors by negotiation; a source edge equipment sending the pseudo wire label message to all the pseudo wire label reflector neighbors who establish signaling session connections thereto; upon receiving the pseudo wire label message, the reflector transferring the pseudo wire label message to the next reflector according to the switch and transfer mode of its own; the next reflector choosing the tunnel between itself and a next hop in the pseudo wire label message as a packet switching network tunnel associated with the pseudo wire label in the pseudo wire label message; repeating the above-described two steps until the next reflector is a target edge equipment; upon receiving the L2 data package, the target edge equipment determining the pseudo wire label for packing the L2 data package and the next hop of the packet switching network tunnel from the received pseudo wire label message; the target edge equipment sending a multiprotocol label switching data package to a reflector of the next hop of the corresponding packet switching network tunnel; upon receiving the multiprotocol label switching data package, the reflector determining the pseudo wire label for packing a L2 data package and the next hop of the packet switching network tunnel from the received pseudo wire label message of the pseudo wire corresponding to the pseudo wire label according to the multiprotocol label switching data package; the reflector sending the re-packed multiprotocol label switching data package to the next reflector of the next hop of the corresponding packet switching network; and repeating the above-described two steps until the next reflector is a source edge equipment.

Preferably, the step of the pseudo wire label reflector and the edge equipment determining whether neighbors support pseudo wire label reflection and whether they are the reflector neighbors by negotiation further comprises: the pseudo wire label reflector and the edge equipment send a extension capacity negotiation message and the information whether the switching supports pseudo wire label reflection and whether they are the reflector neighbors to the pseudo wire label reflector or the edge equipment who establish signaling session connection thereto by adopting the label distribution protocol.

Preferably, the extension capacity negotiation message adopts the format packing parameters of "type-length-value", comprising the parameters supporting pseudo wire label reflection and the parameters who locally are pseudo wire label reflectors.

Preferably, the step of the reflector transferring the received pseudo wire label message to the next reflector further comprises: if the switch and transfer mode is simply switching and transferring, sends the pseudo wire label message to the pseudo wire label reflector passing loop detection directly.

Preferably, the step of the reflector transferring the received pseudo wire label message to the next reflector further comprises: if the switch and transfer mode is "next hop self" transferring, the label value of the pseudo wire label message is modified into the label value distributed for the pseudo wire by itself, and the identification parameters of the next hop and the priority information of the next hop are added or modified, then a new pseudo wire label message is sent.

Preferably, the rule for determining the priority is: if the next hop is a source edge equipment, the priority adopts the biggest value.

Preferably, the step of the target edge equipment determining the pseudo wire label for packing the L2 data package and the next hop of the packet switching network tunnel further comprises: the target edge equipment chooses the label in the pseudo wire label message of the highest priority as the pseudo wire label for packing a L2 protocol data unit and chooses the corresponding next hop as the next hop of the packet switching network tunnel according to the next hop priority information in the pseudo wire label information.

Preferably, the step of the target edge equipment determining the pseudo wire label for packing a L2 data package and the next hop of the packet switching network tunnel further comprises: the target edge equipment adopts the load balance strategy to determine the pseudo wire label and the next hop.

Preferably, the step of the reflector determining the pseudo wire label for packing the L2 data package and the next hop of the packet switching network tunnel further comprises: the reflector chooses the label of the pseudo wire label message of the highest priority as the pseudo wire label for packing the L2 data package and chooses the corresponding next hop as the next hop of the packet switching network tunnel according to the next hop priority information.

Preferably, the step of the reflector determining the pseudo wire label for packing the L2 data package and the next hop of the packet switching network tunnel further comprises: the reflector adopts the load balance strategy to determine the pseudo wire label and the next hop.

Comparing with the prior art, the invention introduces the pseudo wire label reflector into the L2 virtual private network (L2 VPN) and extends the capacity of the existing edge equipment (PE) supporting the pseudo wire label reflector so that the PE equipments participating in the pseudo wire service could establish a star or semi-mesh packet switching network (PSN) tunnel and a label distribution protocol (LDP) signaling session connection with the pseudo wire label reflector respectively. The occurrence of the full mesh PSN tunnel and LDP signaling session connection are avoided by the pseudo wire label reflector switching the pseudo wire label message and the data flow on the pseudo wire. Therefore, the scalability of the network is enhanced which benefits the operation and management of the network. Additionally, the pseudo wire service can also be provided by the pseudo wire label reflector.

DETAILED DESCRIPTION OF THE INVENTION

It is believed that the above and other objects, characteristics and advantages of the invention will be understood more clearly by describing the preferred embodiments of the invention in conjunction with the figures below.

In a L2 virtual private network, a bidirectional pseudo wire is composed of two unidirectional label switching paths (LSP). In the detailed description below, for simplicity (and not lose generality), the pseudo wire is discussed by using the LSP in one data flow direction. The ingress label switching router (LSR) in this data flow direction is referred to as an ingress edge equipment (PE) or upstream PE, whereas egress LSR is referred to as an egress PE or downstream PE. The pseudo wire label message is distributed from downstream PE to upstream PE, whose direction is opposite to the direction of LSP. Therefore, as for the pseudo wire label message, the downstream PE is referred to as a source PE, the upstream PE is referred to as a target PE.

Figure 1:
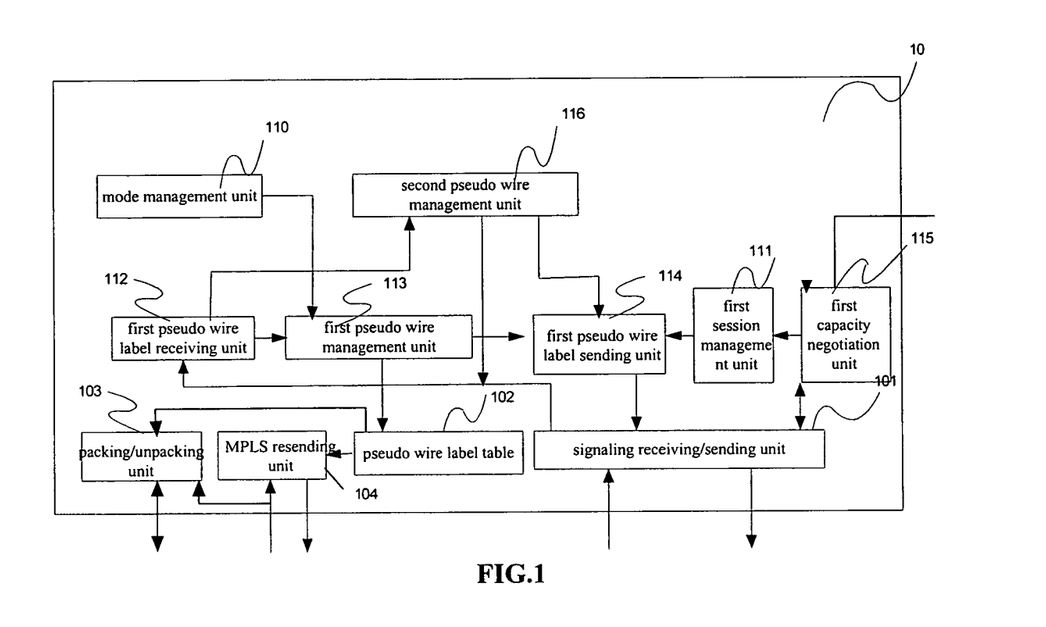
FIG. 1 is a block diagram of the pseudo wire label reflector according to one embodiment of the invention.

FIG. 1 is a block diagram of the pseudo wire label reflector 10 according to one embodiment of the invention. As shown in FIG. 1, the pseudo wire label reflector 10 includes: a signaling receiving/sending unit 101 for distributing a protocol (LDP) signaling message by receiving and sending a label, and for establishing signaling session connections with other pseudo wire label reflectors or edge equipments; a pseudo wire label list 102 for depositing a pseudo wire label and the related information, and is provided for using by a packing/unpacking unit 103 and the multiprotocol label switching and transferring unit 104 as described below; the packing/unpacking unit 103 for packing a L2 data package into a multiprotocol label switching (MPLS) data package by adopting the pseudo wire label provided in the pseudo wire label list 102 upon receiving the L2 data package and unpacking the received MPLS data package into a L2 data package; the multiprotocol label switching (MPLS) and transferring unit 104 for receiving and sending a MPLS data package according to the related information provided in the pseudo wire label list 102. The above-described units are substantially the same as the units in the existing label distribution router (LDP).

Additionally, the pseudo wire label reflector 10 further includes: a mode management unit 110 for determining the switch and transfer mode which the present pseudo wire label reflector 10 adopts to transfer the received pseudo wire label message, and for outputting it into a first pseudo wire management unit 113 described below; a first session management unit 111 for storing and maintaining the support information that the LDP signaling session connection supports pseudo wire label reflecting capacity, which is used as the control information of a first pseudo wire label sending unit 114 described below; a first pseudo wire label receiving unit 112 for receiving the pseudo wire label message by the signaling receiving/sending unit 101 and outputting it to a first pseudo wire management unit 113 described below; the first pseudo wire management unit 113 for storing the pseudo wire state switched and transferred by the present pseudo wire label reflector 10, and outputting the related information to the pseudo wire label list 102, while determining whether to modify the pseudo wire label message according to the switch and transfer mode determined by the mode management unit 110; the first pseudo wire label sending unit 114 for receiving the pseudo wire label message from the first pseudo wire management unit 113 and sending it by the signaling receiving/sending unit 101.

Preferably, the mode of switching and transferring the pseudo wire label message includes both simple switch and transfer and "next hop self" transfer. If the mode is simple switch and transfer, transfer the information in the pseudo wire label message without modification; if the mode is "next hop self" transfer, modify the information in the pseudo wire label message and modify the next hop identifier transferred by the data on the pseudo wire into itself.

It can be known from the above description, by adopting the present embodiment, the pseudo wire label message can be transferred to other pseudo wire label reflectors and edge equipments. During transferring the pseudo wire label message, it can be designated as the next hop transferred by the data on the pseudo wire (that is, LSP next hop) according to the transfer mode. As well, other pseudo wire label reflectors used as the LSP next hop are supported.

Furthermore, the pseudo wire label reflector 10 further includes: a first capacity negotiation unit 115 for exchanging the information supporting the pseudo wire label reflect capacity with neighbors (edge equipments or other pseudo wire label reflectors) by the signaling receiving/sending unit 101 and outputting it into the first session management unit 111, wherein the information comprising whether they support pseudo wire label reflection and whether they are pseudo wire label reflector neighbors.

It can be known from the above description, by adopting the present embodiment, the supporting capacity that the neighbors support the pseudo wire label reflection and the reflector neighbors can be further identified.

Furthermore, the pseudo wire label reflector 10 further includes: a second pseudo wire management unit 116 for storing the pseudo wire state when the present pseudo wire label reflector 10 is used as an edge equipment (PE) and for outputting the related information into the pseudo wire label list 102, while sending the pseudo wire label message to the first pseudo wire label sending unit 114. If it is indicated in the pseudo wire label message received by the first pseudo wire label receiving unit 112 that the target PE of the pseudo wire label is the present pseudo wire label reflector, the second pseudo wire management unit 116 saves the pseudo wire state and outputs the related information into the pseudo wire label list 102; when the pseudo wire label reflector 10 is configured with a pseudo wire of a local egress (virtual circuit), the second pseudo wire management unit 116 sends the pseudo wire label message generated locally to the first pseudo wire label sending unit 114.

It can be known from the above description, by adopting the present embodiment, the pseudo wire label reflector can be used as an edge equipment.

When the pseudo wire label reflector 10 receives multiple pseudo wire label messages of one pseudo wire, the first pseudo wire management unit 113 and the second pseudo wire management unit 116 need to choose a pseudo wire label. Therefore, the first pseudo wire management unit 113 and the second pseudo wire management unit 116 further include: a device for comparing the priorities of the pseudo wire label messages, a device for choosing a pseudo wire label, and a device for writing the pseudo wire label into the pseudo wire label list 102, wherein the device for choosing the pseudo wire label chooses the pseudo wire label whose priority is the highest as the pseudo wire label. Optionally, the first pseudo wire management unit 113 and the second pseudo wire management unit 116 could adopt the load balance strategy to choose the pseudo wire label so that the flux on the pseudo wire are load shared on multiple label.

It can be known from the above description, by adopting the present embodiment, the priority of the pseudo wire label could be supported.

Furthermore, the pseudo wire label reflector further includes a neighbor capacity configuration unit. When the neighbors can not support the capacity negotiation function, the pseudo wire label reflector can designate the capacity negotiation function of the neighbors in configuration manner.

Figure 2:
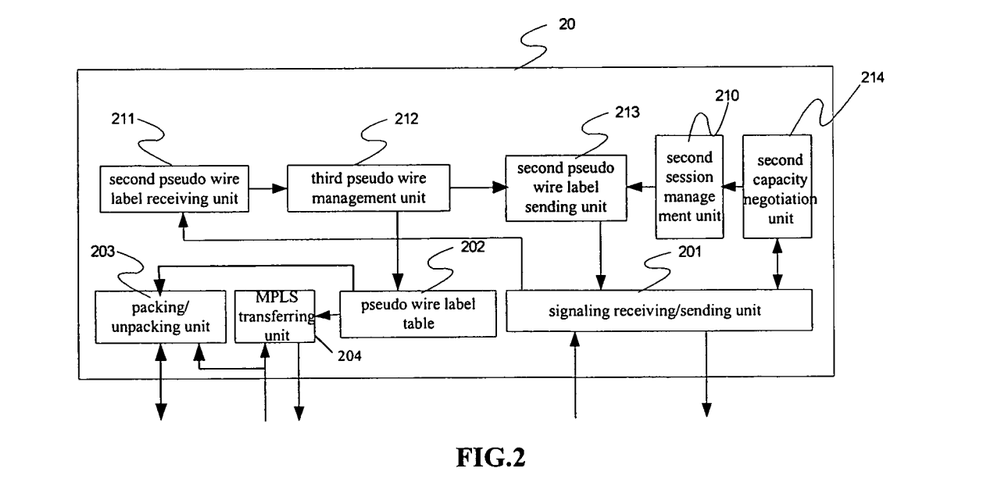
FIG. 2 is a block diagram of the edge equipment according to one embodiment of the invention.

FIG. 2 is a block diagram of the edge equipment 20 according to one embodiment of the invention. As shown in FIG. 2, the edge equipment 20 includes: a signaling receiving/sending unit 201 for establishing LDP signaling session connections with other pseudo wire label reflectors or edge equipments by receiving and sending a LDP signaling message; a pseudo wire label list 202 for depositing pseudo wire labels and the related information, and is provided for using by a packing/unpacking unit 203 and a multiprotocol label switching and transferring unit 204 described below; the packing/unpacking unit 203 for packing a L2 data package into a MPLS data package upon receiving the L2 data package by adopting the pseudo wire label provided in the pseudo wire label list 202 and unpacking the received MPLS data package into a L2 data package; the multiprotocol label switching and transferring unit 204 for receiving and sending the MPLS data package according to the related information provided in the pseudo wire label list 202. The above-described units are substantially the same as the units in the existing edge equipment (PE).

Furthermore, the edge equipment 20 further includes: a second session management unit 210 for storing the information about which neighbors are the pseudo wire label reflectors; a second pseudo wire label receiving unit 211 for outputting the pseudo wire label message to a third pseudo wire management unit 212 described below for processing when receiving the pseudo wire label message by the signaling receiving/sending unit 201; the third pseudo wire management unit 212 for storing the pseudo wire state and sending the related information to the pseudo wire label list 202, while sending the pseudo wire label message to a second pseudo wire label sending unit 213; the second pseudo wire label sending unit 213 for sending the pseudo wire label message sent by the third pseudo wire management unit 212 via the signaling receiving/sending unit 201 upon receiving it. If it is indicated in the pseudo wire label message received by the second pseudo wire label receiving unit 211 that the target PE of the pseudo wire label is the present edge equipment, the third pseudo wire management unit 212 saves the pseudo wire state and outputs the related information to the pseudo wire label list 202; then sends the pseudo wire label message generated locally to the second pseudo wire label sending unit 213.

It can be known from the above description, by adopting the present embodiment, the pseudo wire label reflector could be supported to receive the pseudo wire label message from the pseudo wire label reflector neighbors.

Furthermore, the edge equipment 20 further includes: a second capacity negotiation unit 214 for exchanging the information supporting the pseudo wire label reflect capacity with neighbors (edge equipments or other pseudo wire label reflectors) by the signaling receiving/sending unit 201 and outputting it into the second session management unit 210, wherein the information comprising whether supports the pseudo wire label reflection and whether they are pseudo wire label reflector neighbors.

It can be known from the above description, by adopting the present embodiment, the reflector neighbors can be further identified.

When the edge equipment 20 receives multiple pseudo wire label messages of one pseudo wire, the third pseudo wire management unit needs to choose a pseudo wire label. Therefore, the third pseudo wire management unit 212 further includes: a device for comparing the priorities of the pseudo wire label messages, a device for choosing the pseudo wire label, and a device for writing the pseudo wire label into the pseudo wire label list 202, wherein the device for choosing a pseudo wire label chooses the pseudo wire label whose priority is the highest as the pseudo wire label. Optionally, the third pseudo wire management unit 212 could adopt the load balance strategy to choose the pseudo wire label so that the flux on the pseudo wire are load shared on multiple labels.

It can be known from the above description, by adopting the present embodiment, the priority of the pseudo wire label could be supported.

Furthermore, the invention provides a L2 virtual private network including at least one above-described pseudo wire label reflector and at least two above edge equipments, wherein at least two edge equipments adopt LDP protocol to establish signaling session connection by one pseudo wire label reflector. By adopting the present network, since the pseudo wire label reflector is added, the double end PEs participating in the pseudo wire service could establish a star or semi-mesh PSN tunnel and a LDP signaling session connection with the pseudo wire label reflector respectively. Therefore, the occurrence of the full-mesh PSN tunnel and the LDP signaling session connection are avoided so that the virtual private network have better network scalability.

Figure 3:
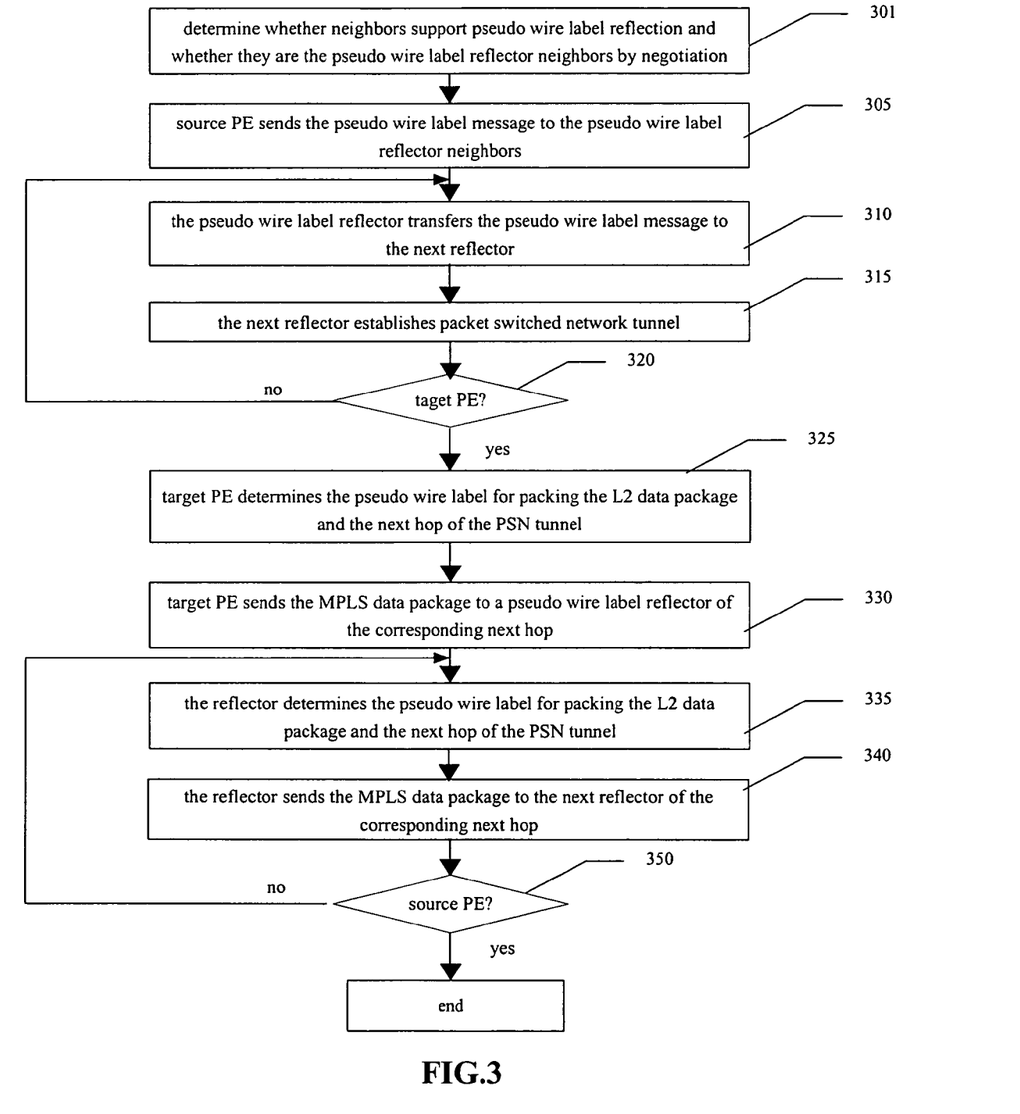
FIG. 3 is a flow chart of providing pseudo wire service according to one embodiment of the invention.

FIG. 3 is a flow schematic diagram of providing pseudo wire service according to an embodiment of the invention. In step 301, a pseudo wire label reflector and a edge equipment (PE) determine whether neighbors support pseudo wire label reflection and whether they are the pseudo wire label reflector neighbors by negotiation. In step 305, a source PE sends a pseudo wire label message to all the pseudo wire label reflector neighbors who establish signaling session connection thereto. In the present embodiment, by extending the information related to the double end PEs of the pseudo wire in the pseudo wire label message, the target PE (that is, the target that the pseudo wire label transferred to) in the pseudo wire label message could be identified by the pseudo wire label reflector. The extending to the pseudo wire label message will be described in detail hereinafter. If the signaling session connection is established directly between the source PE and the target PE, the source PE will also send the pseudo wire label message to the target PE. In step 310, upon receiving the pseudo wire label message, the pseudo wire label reflector transfers the pseudo wire label message to a next reflector according to a switch and transfer mode of its own. The switch and transfer mode of the pseudo wire label reflector includes both simple switch and transfer and "next hop self" transfer. Different transfer mode adopts different operations which will be described according to the preferred embodiments hereinafter. In step 315, the next reflector chooses the tunnel between itself and the next hop in the pseudo wire label message as the packet switching network (PSN) tunnel associated with the pseudo wire label in the pseudo wire label message. In the present specification, "next hop" refers to the label switching router processing the pseudo wire label next on the pseudo wire data layer, which can be a pseudo wire label reflector or an edge equipment PE. If the identifier of the next hop is not existed in the pseudo wire label message, the source PE is tolerated as the next hop. Then repeat the steps 310 and 315 until reaching the target PE (step 320).

By the above steps, the pseudo wire label message is transferred to the target PE from the source PE via the pseudo wire label reflector. Of course, more than one pseudo wire label reflectors may be passed through.

In step 325, upon receiving a L2 data package, the target PE determines the pseudo wire label of the packed L2 data package and the next hop of the PSN tunnel from the received pseudo wire label message. It will be described in detail hereinafter how to determine the pseudo wire label and the next hop. In step 330, the target PE packs according to the determined pseudo wire label and sends the resulted MPLS data package to the pseudo wire label reflector of the corresponding next hop. In step 335, upon receiving the MPLS data package, the reflector determines the pseudo wire label of the packed L2 data package and the next hop of the PSN tunnel from all the received pseudo wire label message of the pseudo wire corresponding to the pseudo wire label if the reflector finds that the MPLS data package is packed by adopting the pseudo wire label distributed by himself according to the pseudo wire label of the MPLS data package. In step 340, the reflector replaces the primary pseudo wire label with the newly determined pseudo wire label and then sends the MPLS data package to the next reflector of the corresponding next hop. Repeat steps 335 and 340 until the next reflector is a source PE (step 350).

Therefore, the L2 PDU could be transported to the source PE (downstream PE) from the target PE (upstream PE) via the pseudo wire label reflector. Of course, multiple pseudo wire label reflectors being passed can be adopted, whose number is the same as that of the pseudo wire label reflectors passed for transporting the pseudo wire label message.

It should be noted that upon all the pseudo wire label messages received become ineffective, the pseudo wire label reflector need to send a label cancellation message to cancel the pseudo wire label message being transferred.

It can be known that from the above description, by adopting the present embodiment, providing pseudo wire service in the L2 virtual network by the pseudo wire label reflector could be accomplished.

In the present embodiment, in order to accomplish transferring the pseudo wire label message by the pseudo wire label reflector, the pseudo wire label reflector must be enabled to identify the target PE in the pseudo wire label message. However, the existing LDP protocol considers that the LDP session connection should be established between the source PE and the target PE directly and transports the pseudo wire label message on the session connection to establish the pseudo wire. Therefore, the information of the source PE and the target PE are not included in the generalized ID FEC element (GID FEC Element) and the virtual circuit ID FEC element (VCID FEC Element). Therefore, the GID FEC Element is not adequate to describe a pseudo wire independently.

Therefore, in the invention, the definition of the LDP protocol to the GID FEC Element and the VCID FEC Element as well as the packing format are extended so that they can carry the information relating to the double end PEs of the pseudo wire. In the extended GID FEC Element and the VCID FEC Element packing format, a SPE-LSR-ID TLV field and a TPE-LSR-ID TLV field are added, which carry label switching router (LSR) identifiers of the source PE and the target PE of the signaling of the label switching path (LSP). The definitions of other fields are exactly the same as the existing LDP signaling protocol.

A bidirectional pseudo wire actually is composed of two unidirectional LSP. Each LSP of the pseudo wires could be marked: <Source PE, <AGI, SAII>, Target PE, <AGI, TAII>> or <Source PE, <Group, VCID>, Target PE, <Group, VCID>>.

Additionally, the pseudo wire label message could include the identifier of the next hop for informing the LDP peer (PE or reflector) for receiving the pseudo wire label message about that the pseudo wire label is distributed or redistributed by the designated next hop. When the LDP peer which receives pseudo wire label message packs the L2 data package by adopting the pseudo wire label package and will transfer the L2 data package on the pseudo wire, the LDP peer should establish a PSN tunnel with the next hop designated in the pseudo wire label message. If no identifier of the next hop is existed in the pseudo wire label message, the source PE is tolerated as the next hop.

In order to cope with the situation of multiple pseudo wire label reflectors, the priority information of the next hop can also be included in the pseudo wire label message. When PE or the reflector receives multiple pseudo wire label messages of one pseudo wire, PE or the reflector could firstly choose the label in the pseudo wire label message whose next priority is the biggest as the label according to the priority of the next hop; it can also adopt the load balance strategy to choose the label in a certain pseudo wire label message as the label. If no the identifier of the next hop is existed in the pseudo wire label message, there is no priority information of the next hop.

The priority of the next hop could be ranged from 0 to 255. If the next hop is a source PE, its priority is the highest, 255; otherwise, the priority of the next hop is ranged from 0 to 254.

If the identifier of the next hop is included in the pseudo wire label message (the priority information of the next hop is not included), its priority is the lowest, 0.

The information of the source PE and the target PE could be obtained and the priority of the pseudo wire label message could be supported by adopting the extended LDP protocol and adding the related information of the next hop in the pseudo wire label message.

At the beginning of providing the pseudo wire service, both the pseudo wire label reflector and the PE need to determine the supporting capacity of the neighbors to pseudo wire label reflection and identify the reflector neighbors. Therefore, the invention provides the extending capacity negotiation mechanism of the LDP protocol.

Both the PE and the reflector should not send the pseudo wire label message with the extended GID FEC Element, the identifier of the next hop and the priority information of the next hop to the PE which does not support pseudo wire label reflection. In order to not influence the stability of the LDP session and not influence other operations of the LDP, the present invention provides a LDP extension capacity negotiation message. By such LDP extension capacity negotiation message, the supporting capacity of the pseudo wire label reflection could be negotiated dynamically between LDP peers. When the capacity of the LDP peer changed, the capacity could be renegotiated without interrupting the LDP session.

The parameters in the extension capacity negotiation message could be packed in "type-length-value (TLV)" format, including two capacity parameters which can be negotiated, one is the supporting capacity parameter for pseudo wire label reflection, the other is a parameter who locally is a pseudo wire label reflector.

The supporting capacity parameter for pseudo wire label reflection represents that whether the present LSR supports pseudo wire label reflection, whether the present LSR could send the pseudo wire label message with the extended GID FEC Element, the identifier of the next hop and the priority of the next hop to the present LSR. The parameter who locally is a pseudo wire label reflector represents whether the present LSR is a pseudo wire label reflector.

When the supporting capacity of the pseudo wire label reflector or the PE at one end of the LDP has changed, the pseudo wire label reflector or the PE can inform the LDP peer its capacity change by automatic negotiation. If the extension capacity negotiation message of the peer is not received, it is indicated that the peer has no extension capacity. When receiving the extension capacity negotiation message, the LSR which does not support the extension capacity negotiation message could discard the message.

In the L2 VPN network, all the LDP speakers should adopt a free label keeping mode to keep the pseudo wire label and should adopt downstream independent label distribution mode when distributing the pseudo wire label. The invention is compatible with draft-ietf-pwe3-control-protocol-06.txt protocol on these two points.

In the draft-ietf-pwe3-control-protocol-06.txt protocol, the label is only transferred between PE and PE. Therefore, there is no difference between the independent label distribution controlling mode and the ordered label distribution controlling mode. However, in the invention, all the LDP speakers participating in distributing the pseudo wire label (including PE and the pseudo wire label reflectors) adopt the ordered label distribution controlling mode, that is LSR sending the pseudo wire label message to the upstream PE or the pseudo wire label reflector only when LSR receives the pseudo wire label message of the downstream PE and LSR itself is the downstream PE of the pseudo wire.

If the PE does not support pseudo wire label reflection, it could only distribute the pseudo wire label message to the PE at the other end of the pseudo wire. If the PE supports pseudo wire label reflection, the reflector neighbors could be identified automatically by the negotiation capacity extension message. The PE supporting pseudo wire label reflection not only distributes the pseudo wire label message to the PE at the other end of the pseudo wire (if there is direct signaling session between them) on its own responsibility, but also distributes the pseudo wire label message to all the reflector neighbors.

The pseudo wire label reflector switches the pseudo wire label message to other pseudo wire reflectors or the target PE in the pseudo wire label message only if it receives the pseudo wire label message from the downstream PE or the downstream pseudo wire label reflector. If the pseudo wire label reflector itself is the target PE in the pseudo wire label message, here the pseudo wire label reflector actually is the target PE in the pseudo wire label message without transferring the pseudo wire label message to any neighbors. If the target PE in the pseudo wire label message does not support pseudo wire label reflection, the pseudo wire label reflector does not transfer the pseudo wire label message to the pseudo wire label reflector.

If the pseudo wire label reflector receives the pseudo wire label message from the neighbors who do not support pseudo wire label reflection, it should be considered as that the target PE in the pseudo wire label message is the present reflector.

Upon receiving the pseudo wire label mapping message, the target PE in the pseudo wire label message from the reflector or the downstream PE could choose the best label according to the priority information carried in the pseudo wire label message or could adopt the load balance strategy to choose the label. Meanwhile, the tunnel led to the next hop LSR in the pseudo wire label message should be chose as a PSN tunnel.

By above-described extension capacity negotiation message, the pseudo wire label reflector and the PE could know whether the neighbors support pseudo wire label reflection and whether they are pseudo wire label reflector neighbors.

In the present embodiment, the switch and transfer mode for the pseudo wire label reflector transferring the pseudo wire label message could be both simple switch and transfer and next hop self transfer.

Figure 4:
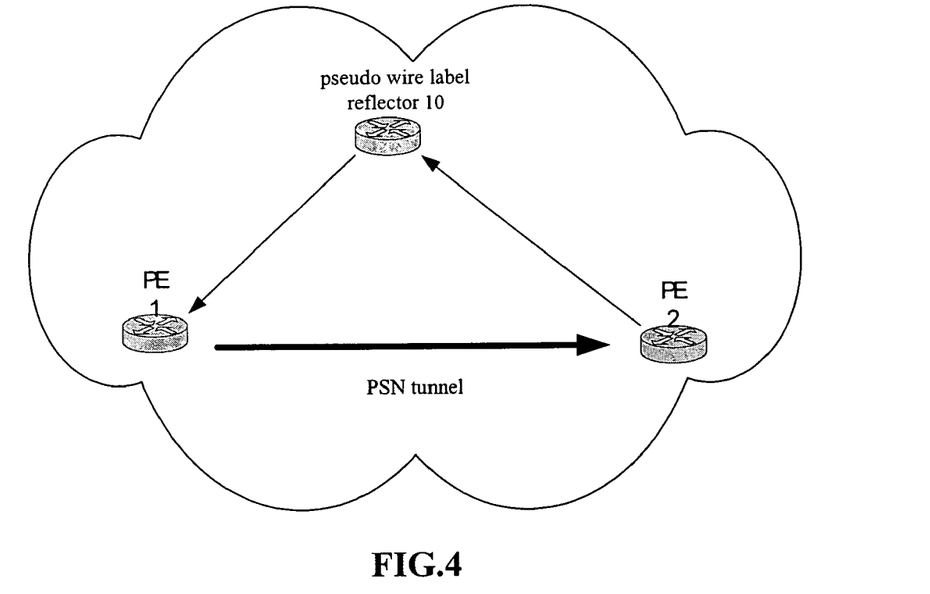
FIG. 4 is a schematic diagram of providing pseudo wire service in the L2 virtual private network of one embodiment of the invention according to another embodiment of the invention, wherein the pseudo wire label reflector adopts simple switch and transfer mode.

FIG. 4 gives a schematic diagram of providing pseudo wire service by the pseudo wire label reflector which adopts the simple switch and transfer mode. In the simple switch and transfer mode, the pseudo wire label reflector does not modify the label value in the pseudo wire label message, the identifier of the next hop and the priority information of the next hop. Upon receiving the pseudo wire label message, the pseudo wire label reflector transfers the pseudo wire label message to appropriate neighbors directly, wherein "appropriate neighbors" refers to other pseudo wire label reflectors passing the loop detection and the target PE, wherein the loop detection refers to the path detection and/or the hop count detection defined in the existing LDP protocol.

As shown in FIG. 4, the pseudo wire service is provided between PE1 and PE2. There is no direct signaling session connection between PE1 and PE2 when establish the pseudo wire LSP in PE1→PE2 direction, but PE1 and PE2 establish the signaling session connection with the pseudo wire label reflector 10. Firstly, PE2 sends the pseudo wire label message in which the information of the source PE and the target PE "Source PE=PE2, Target PE=PE1" is carried to the pseudo wire label reflector 10. Upon receiving the pseudo wire label message, the pseudo wire label reflector transfers it directly to PE1 due to adopting simple switch and transfer mode. Therefore, upon receiving the pseudo wire label message, PE1 could associate the pseudo wire label message with the pseudo wire LSP in PE1→PE2 direction according to the information in the pseudo wire label message. Meanwhile, PE1 obtains the in-label distributed by PE2 for the PW LSP in PE1→PE2 direction, because the label is distributed by PE2, i.e., PE2 is the next hop. Therefore, the PSN tunnel is established between PE1→PE2.

Of course, there could be multiple pseudo wire label reflectors between PE1 and PE2. The processing procedure is the same as that of the above-described pseudo wire label reflector.

In the above simple switch and transfer mode, the pseudo wire label reflector only participates in the pseudo wire establishing and maintaining process of the controlling layer rather than the data transferring process.

Figure 5:
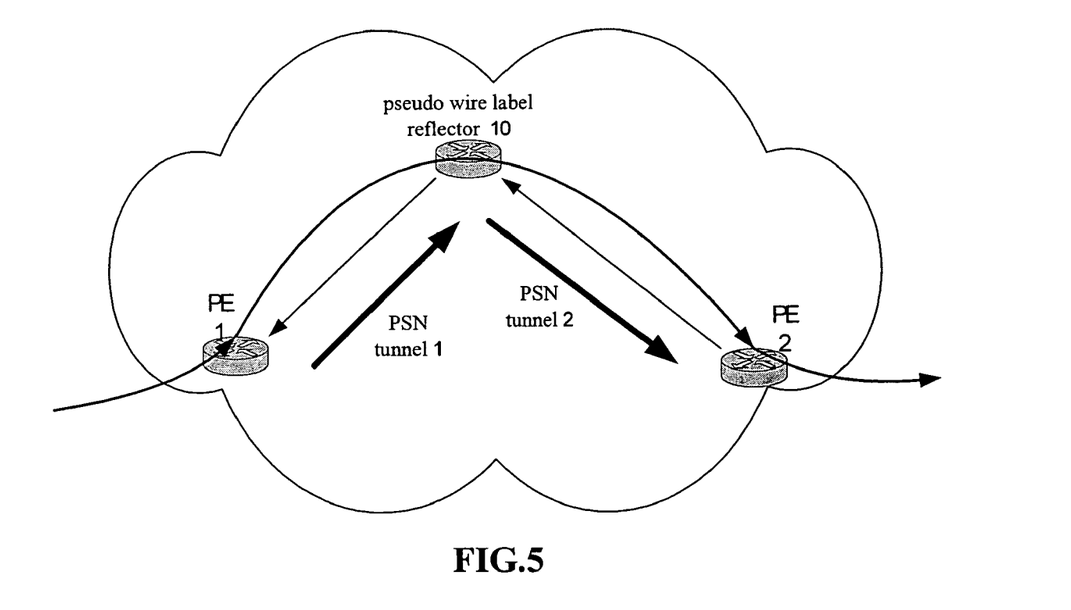
FIG. 5 is a schematic diagram of providing pseudo wire service in the L2 virtual private network of yet another embodiment of the invention according to yet another embodiment of the invention, wherein the pseudo wire label reflector adopts "next hop self" transfer mode.

FIG. 5 gives a schematic diagram of providing pseudo wire service by the pseudo wire label reflector which adopts the next hop self transfer mode. In next hop self transfer mode, the pseudo wire label reflector participates in the pseudo wire label process and the transfer of the L2 data package. The pseudo wire label reflector needs to redistribute its label for the pseudo wire to replace the label value in the primary pseudo wire label message, and add or modify the identifier of the next hop and the priority information of the next hop. The pseudo wire label reflector requires the next pseudo wire label reflector or PE to establish PSN tunnel with itself by distributing a new label for the pseudo wire and informing the next pseudo wire label reflector or PE with the identifier of the next hop about that the label in the pseudo wire label message is distributed by the pseudo wire label reflector. And the pseudo wire label reflector adopts the new label to pack the L2 data package and then transfers to the pseudo wire label reflector via the PSN tunnel.

As shown in FIG. 5, the pseudo wire label reflector 10 receives the pseudo wire label message sent by PE2, wherein the pseudo wire label value is L1. Then the pseudo wire label reflector 10 distributes the corresponding in-label L2 and bonds it with the label in the pseudo wire label message sent by PE2, then writes it into a in-label transfer list LIB; meanwhile, establishes a PSN tunnel 2 with PE2. The pseudo wire label reflector replaces the label value (L1) in the pseudo wire label message with the label value (L2) distributed by itself and add or modify the identifier of the next hop whose value is the identifier ID of itself. Then, the pseudo wire label reflector 10 sends the modified pseudo wire label message to PE1. PE1 establishes the PSN tunnel 1 with the pseudo wire label reflector 10. Upon packing the data package by adopting the label L2, PE1 sends it to the pseudo wire label reflector 10 via the PSN tunnel 1. Then, the pseudo wire label reflector 10 replaces label L2 with L1 distributed by PE2 and transfers it to PE2 via the PSN tunnel 2.

For the L2 VPN in which the pseudo wire label reflector adopts the next hop self transfer mode, the pseudo wire is still configured between PEs. The pseudo wire label reflector is transparent to the manager of PE. There is no need to make the configuration of the specific pseudo wire LSP, which can be obtained by studying.

Figure 6:
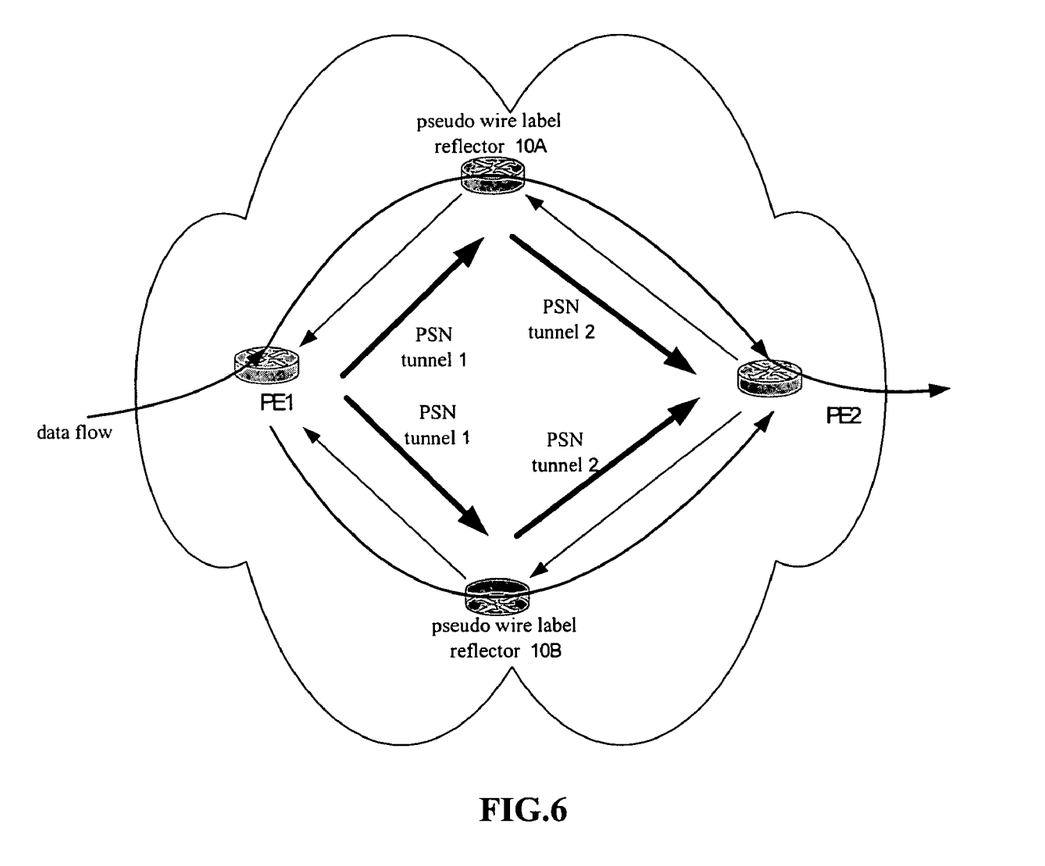
FIG. 6 is a schematic diagram of providing pseudo wire service in the L2 virtual private network including multiple pseudo wire label reflectors of yet another embodiment of the invention according to yet another embodiment of the invention.

FIG. 6 is a schematic diagram of providing pseudo wire service in a L2 virtual private network including multiple pseudo wire label reflectors. In present embodiment, there are two pseudo wire label reflectors 10A and 10B between PE1 and PE2. In this case, PE1 could receive multiple pseudo wire label messages of one pseudo wire. If both the pseudo wire label reflector 10A and 10B adopt the next hop self transfer mode, the next hop in the pseudo wire label message received by PE1 could be different. The priority of the pseudo wire label reflector which adopts the next hop self transfer mode could be designated and took in the pseudo wire label message. Therefore, PE1 could choose the pseudo wire label reflector whose priority is high as the next hop and choose the corresponding pseudo wire label as the label according to the priority information of the next hop in the pseudo wire label message. If the priorities of the next hop are same, the reflector whose identifier is smaller is chose as the next hop. Of course, a certain load balance strategy could be adopted to share the load on multiple paths.

Two embodiments which use the present invention to accomplish cross-domain pseudo wire service are given below. Generally, LDP is a label distribution protocol in the domain. When need to provide cross-domain pseudo wire service, establishing large numbers of cross-domain LDP signaling sessions is not appropriate. The managers of the autonomous systems could determine to establish a limited number of LDP sessions between the autonomous systems by negotiation, thereby accomplish the establishment and maintenance of the cross-domain pseudo wire. It could be accomplished by the pseudo wire label reflector.

Figure 7:
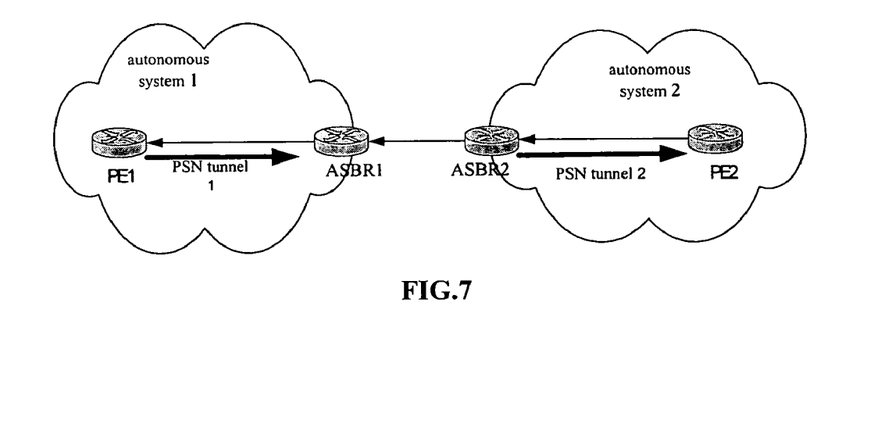
FIG. 7 is a schematic diagram of providing cross-domain pseudo wire service according to yet another embodiment of the invention, wherein an autonomous domain border router (ASBR) is used as a pseudo wire label reflector.

As shown in FIG. 7, PE1 and PE2 are located at autonomous system 1 and autonomous system 2. When providing pseudo wire service between PE1→PE2, the autonomous domain border router (ASBR) is used as the pseudo wire label reflector, that is add the pseudo wire label reflector shown in FIG. 1 on the basis of the primary ASBR or both coincide at the network and work in the next hop self transfer mode. In this mode, it used as the next hop of the label switching path LSP.

The pseudo wire label message is sent from PE2 to ASBR2. ASBR2 distributes a new label. ASBR2 replaces the primary label in the pseudo wire label message with the new label and modify the next hop of the pseudo wire label message into itself (ASBR2). ASBR2 establishes a PSN tunnel 2 with PE2 and then sends the modified pseudo wire label message to ASBR1. Upon receiving it, ASBR1 distributes a new pseudo wire label. ASBR1 replaces the primary label in the pseudo wire label message with the new label and modify the next hop of the pseudo wire label message into itself (ASBR1). ASBR1 then sends the pseudo wire label message to PE1. Upon receiving it, PE1 establishes a PSN tunnel 1 with ASBR1.

The L2 data package received from the L2 VPN interface of PE1 is firstly packed within the pseudo wire label distributed by ASBR1 and sent to ASBR1 via PSN tunnel 1. In ASBR1, the pseudo wire label is replaced with the pseudo wire label distributed by ASBR2 and then the packed data package is sent to ASBR2. In ASBR2, the pseudo wire label is replaced again with the pseudo wire label distributed by PE2 and then the packed data package is sent to PE2 via PSN tunnel 2 and finally transferred to the L2 VPN interface of PE2.

In the embodiment, there is no need to establish the PSN tunnel between ASBR1 and ASBR2 and adopt the pseudo wire label to cross ASBR.

Figure 8:
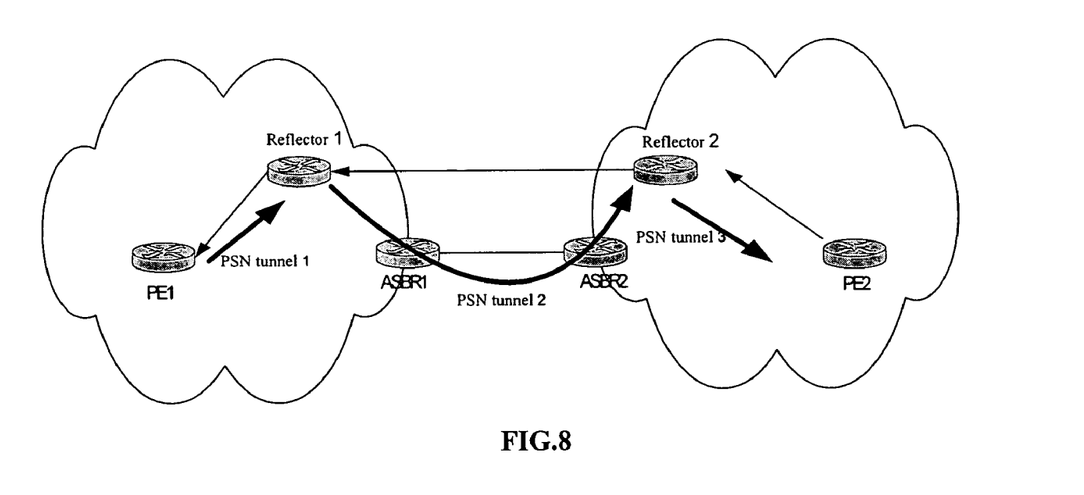
FIG. 8 is a schematic diagram of providing cross-domain pseudo wire service according to yet another embodiment of the invention, wherein an autonomous domain border router (ASBR) is not used as a pseudo wire label reflector.

FIG. 8 provides another embodiment providing cross-domain pseudo wire service, wherein PE1 and PE1 are located at autonomous system 1 and autonomous system 2 respectively. The autonomous domain border router ASBR1 and ASBR2 are not used as the pseudo wire label reflector, but a pseudo wire label reflector is added between two autonomous systems respectively. Each pseudo wire label reflector works in the next hop self transfer mode. The process providing cross-domain pseudo wire service is illuminated by taking the PE1→PE2 direction for example.

The pseudo wire label message is sent from PE2 to the pseudo wire label reflector 2. The pseudo wire label reflector 2 distributes a new label, replaces the primary label in the pseudo wire label message with the new label and modifies the next hop in the pseudo wire label message into itself (the pseudo wire label reflector 2). The pseudo wire label reflector 2 establishes a PSN tunnel 3 with PE2 and then sends the modified pseudo wire label message to the pseudo wire label reflector 1. Upon receiving it, the pseudo wire label reflector 1 redistributes a new pseudo wire label, replaces the primary label in the pseudo wire label message with the new label and modifies the next hop in the pseudo wire label message into itself (the pseudo wire label reflector 1). Meanwhile, the pseudo wire label reflector 1 establishes a PSN tunnel 2 with the pseudo wire label reflector 2 and then sends the pseudo wire label message to PE1. Upon receiving it, PE1 establishes a PSN tunnel 1 with the pseudo wire label reflector 1.

The L2 data package received from the L2 VPN interface of PE1 is firstly packed within the pseudo wire label distributed by the pseudo wire label reflector 1 and sent to the pseudo wire label reflector 1 via the PSN tunnel 1 between PE1 and the pseudo wire label reflector 1. Then the pseudo wire label reflector 1 replaces the pseudo wire label with the pseudo wire label distributed by the pseudo wire label reflector 2 and sent to the pseudo wire label reflector 2 via the PSN tunnel 2 between the pseudo wire label reflector 1 and the pseudo wire label reflector 2. Then the pseudo wire label reflector 2 replaces the pseudo wire label again and then sends it to PE2 via the PSN tunnel 3 between the pseudo wire label reflector 2 and PE2 and finally transfer it to the L2 VPN interface of PE2.

In the embodiment, a PSN tunnel from the pseudo wire label reflector 1 to the pseudo wire label reflector 2 is needed between ASBR1 and ASBR2, and the PSN tunnel label is adopted to cross ASBR. This cross-domain PSN tunnel could be established by LDP signaling and also could be established by adopting RSVP-TE (resource obligating protocol flux engineering extension) signaling.

Of course, in both embodiments of FIG. 7 and FIG. 8, the pseudo wire label reflectors could adopt simple switch and transfer mode. Here, more cross-domain PSN tunnels are needed to be established which is more appropriate in the situation of emphasizing the service quality of the pseudo wire.

What is claimed is:

1. A method for providing pseudo wire service in a network comprising:
    a pseudo wire label reflector and an edge equipment determining whether neighbors support pseudo wire label reflection and whether they are the pseudo wire label reflector neighbors by negotiation;
    a source edge equipment sending a pseudo wire label message to all the pseudo wire label reflector neighbors who establish signaling session connection thereto;
    upon receiving the pseudo wire label message, the reflector transferring the pseudo wire label message to next reflector according to the switch and transfer mode of its own;
    the next reflector choosing the tunnel between itself and the next hop of the pseudo wire label message as a packet switching network tunnel associated with the pseudo wire label in the pseudo wire label message;
    repeating the transferring and choosing steps until the next reflector is a target edge equipment;
    upon receiving a L2 data package, the target edge equipment determining the pseudo wire label for packing the L2 data package and the next hop of the packet switching network tunnel from the received pseudo wire label message;
    the target edge equipment sending a multiprotocol label switching data package to the reflector of the next hop of the corresponding packet switching network tunnel;
    upon receiving the multiprotocol label switching data package, the reflector determining the pseudo wire label for packing the L2 data package and the next hop of the packet switching network tunnel from the received pseudo wire label message of the pseudo wire corresponding to the pseudo wire label according to the multiprotocol label switching data package;
    the reflector sending the re-packed multiprotocol label switching data package to the next reflector of the next hop of the corresponding packet switching network; and
    repeating the determining and sending steps until the next reflector is a source edge equipment.

2. The method as claimed in claim 1, wherein the step of the pseudo wire label reflector and the edge equipment determining whether neighbors support pseudo wire label reflection and whether they are the reflector neighbors by negotiation further comprises: the pseudo wire label reflector and the edge equipment sending a extension capacity negotiation message and the information whether the switching supports pseudo wire label reflection and whether they are the reflector neighbors to the pseudo wire label reflector or the edge equipment who establish signaling session connections thereto by adopting the label distribution protocol.

3. The method as claimed in claim 2, wherein the extension capacity negotiation message adopts the format packing parameters of "type-length-value", comprising the parameters supporting pseudo wire label reflection and the parameters who locally are pseudo wire label reflectors.

4. The method as claimed in claim 1, wherein the step of the reflector transferring the received pseudo wire label message to the next reflector further comprises: if the switch and transfer mode is simple switch and transfer, sends the pseudo wire label message to the pseudo wire label reflector passing loop detection directly, wherein the loop detection refers to the path detection and/or the hop count detection defined in the existing label distribution protocol.

5. The method as claimed in claim 1, wherein the step of the reflector transferring the received pseudo wire label message to the next reflector further comprises: if the switch and transfer mode is "next hop self" transfer, the label value in the pseudo wire label message is modified into the label value distributed for the pseudo wire by himself, and the identifier of the next hop and the priority information of the next hop are added or modified, then a new pseudo wire label message is sent.

6. The method as claimed in claim 5, wherein the determining rule of the priority is: if the next hop is the source edge equipment, the priority adopts the biggest value.

7. The method as claimed in claim 1, wherein the step of the target edge equipment determining the pseudo wire label for packing the L2 data package and the next hop of the packet switching network tunnel further comprises: the target edge equipment chooses the label in the pseudo wire label message of the highest priority as the pseudo wire label for packing the L2 protocol data and choose the corresponding next hop as the next hop of the packet switching network tunnel.

8. The method as claimed in claim 1, wherein the step of the target edge equipment determining the pseudo wire label for packing the L2 data package and the next hop of the packet switching network tunnel further comprises: the target edge equipment adopts a load balance strategy to determine the pseudo wire label and the next hop.

* * * * *

UNITED STATES PATENT AND TRADEMARK OFFICE
CERTIFICATE OF CORRECTION

| | | |
|---|---|---|
| PATENT NO. | : 7,801,138 B2 | Page 1 of 1 |
| APPLICATION NO. | : 11/632445 | |
| DATED | : September 21, 2010 | |
| INVENTOR(S) | : Du et al. | |

It is certified that error appears in the above-identified patent and that said Letters Patent is hereby corrected as shown below:

Title page, please insert the following:

Item --(74) *Attorney, Agent, or Firm* – Oppenheimer Wolff & Donnelly LLP--

Signed and Sealed this

Sixteenth Day of November, 2010

David J. Kappos
*Director of the United States Patent and Trademark Office*